United States Patent [19]
Ravon

[11] Patent Number: 6,137,275
[45] Date of Patent: *Oct. 24, 2000

[54] SYSTEM FOR PROVIDING A REGULATED VOLTAGE DURING ABRUPT VARIATIONS IN CURRENT

[75] Inventor: Jean-Michel Ravon, Fuveau, France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 09/089,783

[22] Filed: Jun. 3, 1998

[30] Foreign Application Priority Data

Jun. 4, 1997 [FR] France .................................. 97 07131

[51] Int. Cl.[7] ........................................................ G05F 1/56
[52] U.S. Cl. ................................................................. 323/274
[58] Field of Search .................................. 323/222, 273, 323/274, 280, 282, 284, 351

[56] References Cited

U.S. PATENT DOCUMENTS

| | | | |
|---|---|---|---|
| 3,641,422 | 2/1972 | Farnsworth et al. ..................... | 323/224 |
| 4,602,205 | 7/1986 | Matsuhashi et al. ..................... | 320/64 |
| 4,779,185 | 10/1988 | Musil ........................................ | 363/73 |
| 5,367,247 | 11/1994 | Blocher et al. .......................... | 323/222 |
| 5,534,769 | 7/1996 | Ishii ........................................ | 323/283 |

OTHER PUBLICATIONS

Patent abstract from Japan, vol. 005, No. 034 (E–048), Mar. 4, 1981, & JP 55 160968, NEC Corp.

*Halbleiter–Schaltungstechnik* 1990, Springer, Berlin XP002055006, pp. 371–377.

*Challenges in Powering High Performance Low Voltage Processors*, Renauer, J.G., IEEE vol. 2, Mar. 3, 1996, X) 000585947, pp. 977–983.

*Primary Examiner*—Adolf Deneke Berhane
*Attorney, Agent, or Firm*—Wolf, Greenfield & Sacks, P.C.; James H. Morris; Theodore E. Galanthay

[57] ABSTRACT

The present invention relates to a system for providing a regulated voltage meant to supply a load, including a source for providing a substantially constant current approximately corresponding to the maximum current likely to be surged by the load, and a device receiving the constant current and regulating the load supply voltage, at least one capacitor being connected between an output terminal of the regulation device and the ground.

8 Claims, 2 Drawing Sheets

SYSTEM FOR PROVIDING A REGULATED VOLTAGE DURING ABRUPT VARIATIONS IN CURRENT

BACKGROUND OF THE INVENTION

1. Field of the Invention

The present invention relates to the field of power converters, such as switched-mode power supply systems or linear regulators meant for supplying a load under a regular fixed voltage. Such converters receive a d.c. voltage from a battery or a rectifying bridge of the a.c. mains voltage associated with a storage capacitor. The present invention more specifically applies to maintenance of the load supply voltage even in case of an abrupt variation of the current therein. For example, the present invention applies to power converters for supplying a microprocessor, the current surge of which may vary, with a relatively high recurrence frequency (from on the order of a few hertz to several kilohertz), between a few mA and 10 or 15 A, or even more.

2. Discussion of the Related Art

The increase in microprocessor performance requires power converters with higher and higher performance with respect to their voltage stability and their rate of response to a variation of the charge. For example, a converter for supplying a microprocessor known under trademark "PENTIUM-PRO" of "Intel" must withstand a current variation from 0.3 A to 10 A in 350 nanoseconds with a voltage accuracy of ±5%.

Several conventional solutions are used to improve the response of the converter to such abrupt current variations.

FIG. 1 shows an example of a conventional circuit for supplying a microprocessor. A DC/DC converter 1 receives a supply voltage Ve, for example, +12 volts or +5 volts and provides a voltage Vin to a microprocessor 2. The value of voltage Vin (for example, +2.1 to +3.5) volts is generally set by microprocessor 2 which communicates with converter 1 over a digital link 3. Several chemical storage capacitors C are connected in parallel between supply line Vin and the ground to limit the transient variations of voltage Vin after a variation of the current surged by microprocessor 2. One or several ceramic decoupling capacitors C' are generally connected between a supply terminal S of the microprocessor receiving voltage Vin and the ground.

A disadvantage of this solution is that capacitors of high capacitances, which must further have a very low equivalent series resistance and inductance, are very expensive. A conventional solution such as shown in FIG. 1 typically requires, for the above example of a "PENTIUM-PRO" microprocessor, ten chemical capacitors of 1500° F., each having an equivalent series resistance of 44 mΩ, to reach a capacitance higher than 4000 µF with an equivalent series resistance lower than 5 mΩ corresponding to the constraints set by the manufacturer. Further, the equivalent series inductance of a capacitor generally is 10 nH.

Another solution, applicable if the power converter is a switched-mode power supply (PWM), is to operate the switched-mode power supply at high switching frequencies. If such a solution requires chemical capacitors of lower capacitance between the converter and the microprocessor, their equivalent series inductance and resistance remain critical as concerns the cost. Further, designing a switched-mode power supply operating at 500 kHz, or even more, requires the use of high performance components, especially to stabilize the feedback loop while taking into account the behavior of the components and the pattern of the printed circuit at such a high frequency.

SUMMARY OF THE INVENTION

The present invention aims at providing a novel solution to limit the excursion of the supply voltage of a microprocessor after an abrupt variation of the current surged by the microprocessor. More generally, the present invention aims at providing a device for limiting transient variations of the supply voltage of a load, the current of which is likely to undergo abrupt variations, from a power converter.

The present invention also aims at reducing or minimizing the energy dissipation of this limiting device.

To achieve these and other objects, the present invention provides a system for providing a regulated voltage to supply a load, including:

a source for providing a substantially constant current approximately corresponding to the maximum current likely to be drawn by the load; and a regulation device receiving, on an input terminal, the constant current and providing, on an output terminal, the regulated load supply voltage, at least one capacitor being connected between the output terminal and the ground.

According to an embodiment of the present invention, the regulation device includes:

a hysteresis comparator receiving the load supply voltage and a reference voltage; and at least one first MOS transistor, connected between the input terminal and the ground, the first transistor being controlled by the comparator by being biased in the linear portion of its current-voltage characteristic.

According to an embodiment of the present invention, the regulation device includes a Schottky diode connecting the input terminal to the output terminal.

According to an embodiment of the present invention, the regulation device includes a second MOS transistor, the source of which is connected to the input terminal and the drain of which is connected to the output terminal, the second transistor being controlled, from the hysteresis comparator, by a circuit introducing a delay at the turning-on of the second transistor.

According to an embodiment of the present invention, the constant current source is formed of a current-controlled switched-mode power supply, a third MOS transistor, connected between the ground and a first terminal of an inductance, a second terminal of which provides the constant current, being controlled in the linear portion of its current-voltage characteristic.

According to an embodiment of the present invention, the constant current source is formed by a linear current regulator.

According to an embodiment of the present invention, the capacitor is a ceramic capacitor.

The present invention also relates to a device for limiting transient variations of a voltage provided by a power converter forming the current source, including:

a first MOS power transistor connected between the input terminal and the ground;

a one-way conduction element connected between the input terminal and the output terminal; and means for detecting the regulated voltage and for controlling the first transistor in the linear portion of its current-voltage characteristic.

According to an embodiment of the present invention, the one-way conduction component is formed of a second MOS transistor, the source of which is connected to the input terminal and the drain of which is connected to the output terminal.

The foregoing objects, features and advantages of the present invention will be discussed in detail in the following non-limiting description of specific embodiments in connection with the accompanying drawings.

DETAILED DESCRIPTION

Figure 1:
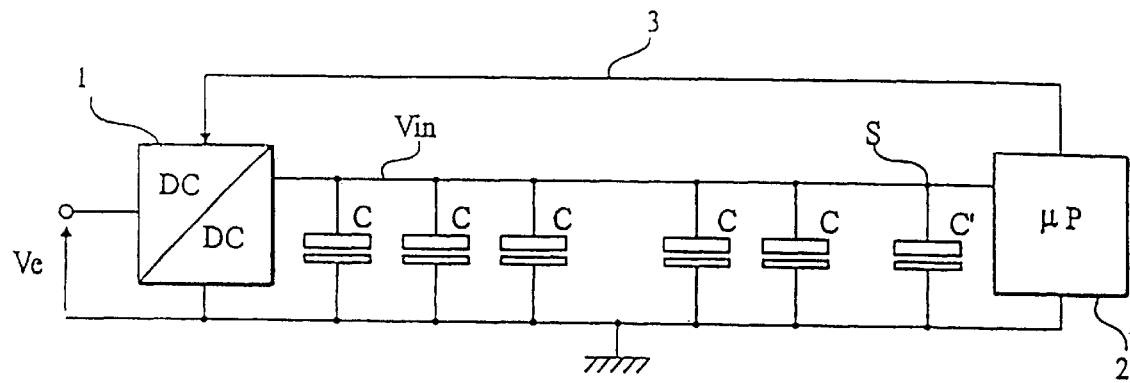
FIG. 1, previously described, is meant to show the state of the art and the problem to solve.

The same elements have been referred to by the same references in the different drawings. For clarity, only those elements necessary to the understanding of the present invention have been shown in the drawings and will be described hereafter.

Figure 2:
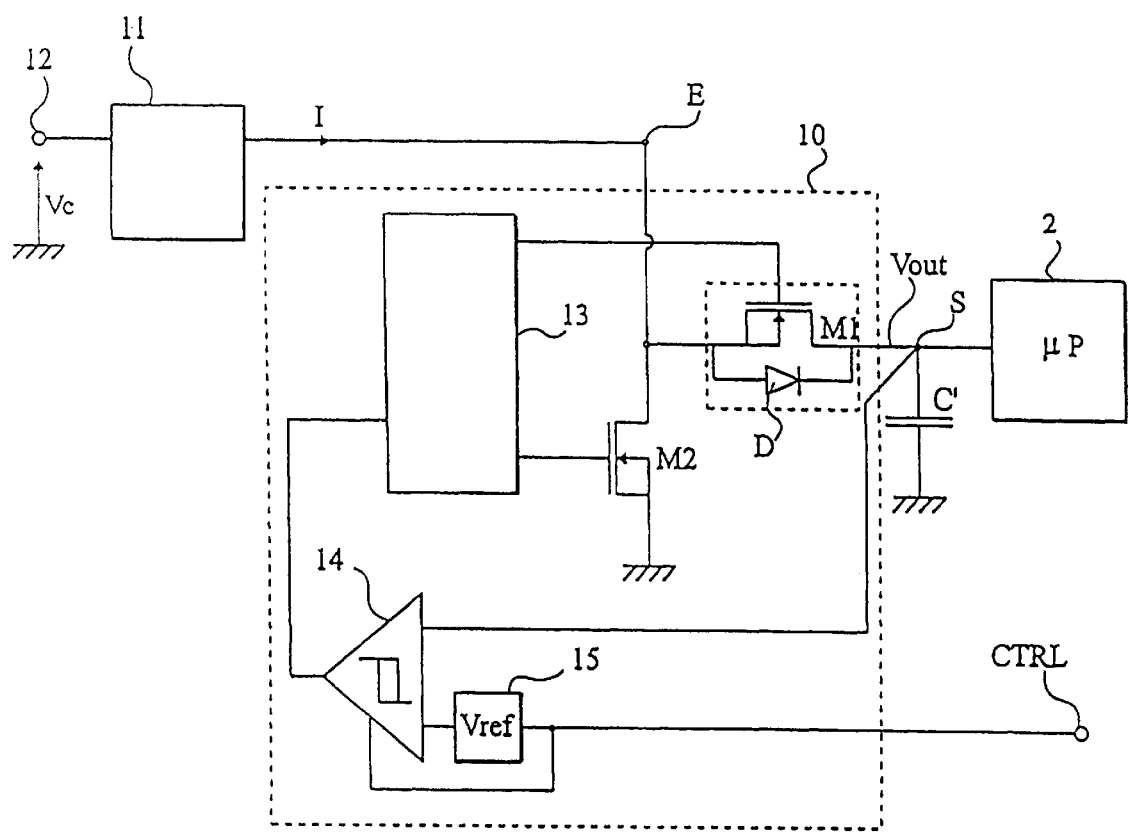
FIG. 2 schematically shows an embodiment of a device according to the present invention, associated with a power converter and a microprocessor.

FIG. 2 schematically shows a first embodiment of a device 10 according to the present invention, for limiting transient variations of a voltage Vout of supply of a load 2, for example, a microprocessor ($\mu$P). Device 10 is, according to the present invention, meant to receive on an input terminal E, a substantially constant current 1, and to issue regulated voltage Vout on a supply terminal S of microprocessor 2. Constant current I is issued by a current source 11 supplied by a d.c. voltage Ve, for example +5 volts, provided on a terminal 12. Voltage Ve can come from a rectified and filtered a.c. power supply.

A feature of the present invention is to dissociate the provision of the supply current from the regulation of the output voltage. Thus, according to the present invention, source 11 is meant to generate current I with a value at least equal to the maximum current that load 2 is likely to consume, and device 10 controls output voltage Vout to maintain it at a given value (for example, between 2.1 volts and 3.5 volts), determined by a control signal sent by load 2 onto a control terminal CTRL of device 10.

One or several ceramic decoupling capacitors C' are, conventionally, placed in parallel between terminal S and the ground. According to the present invention, voltage Vout is permanently issued by capacitor C'.

According to the first embodiment of the present invention, regulation device 10 includes a MOS power transistor M1, here with an N channel, connecting terminals E and S. The source of transistor M1 is connected to terminal E and its drain is connected to terminal S. In FIG. 2, transistor M1 has been shown by representing its intrinsic diode D between the source and the drain.

According to the present invention, terminal E is connected to the ground via a MOS transistor M2, here with an N channel, the source of which is connected to the ground and the drain of which is connected to terminal E. The function of transistor M2 is to absorb the excess of current I during periods when the load only requires a low supply current.

The respective gates of transistors M1 and M2 are connected to output terminals of a control circuit 13. Circuit 13, the constitutive detail of which is not shown, is essentially formed of control amplifiers, associated with level shifting means to adequately bias the gates of transistors M1 and M2, and with timing means to delay the turning on of transistor M1, as will be seen hereafter.

Circuit 13 is controlled by a comparator 14, a first input terminal of which is connected to terminal S to detect voltage Vout, and a second input terminal of which receives a reference voltage Vref issued by a block 15, a control input of which is connected to terminal CTRL. Comparator 14 is a programmable hysteresis comparator, the function of which is to ensure the regulation of voltage Vout across capacitor C'. The mean value of this voltage is adjusted by control terminal CTRL, for example, between 2.1 volts and 3.5 volts. The amplitude of the hysteresis is also adjusted by the control signal present on terminal CTRL to respect the relative tolerance of voltage Vout (generally ±5%). This relative tolerance is used to define the output voltage excursion due to hysteresis comparator 14, taking into account the accuracy of voltage reference circuit 15 (generally 1%), and the response times of comparator 14 and of circuit 13.

A feature of the present invention is that, when it has to be on, transistor M2 is biased to operate in the linear portion of its current-voltage characteristic and thus has a low series resistance. Thus, when transistor M2 has to absorb the unused part of constant current I, the dissipation of device 10 remains however low due to this linear state (unsaturated) operation.

In case of an abrupt current surge by microprocessor 2, voltage Vout has a tendency to fall under value Vref, which causes a switching of the output of comparator 14. Circuit 13 then blocks transistor M2, then turns on transistor M1 to recharge capacitor C' with current I.

A feature of the present invention is that transistor M1 is turned on with a certain delay with respect to the blocking of transistor M2. Thus, the current starts flowing through intrinsic diode D of transistor M1, which imposes the direction of the current in transistor M1 before it is turned on.

In case of an abrupt drop of the current surge by microprocessor 2, voltage Vout increases if this current drop cannot be immediately absorbed by device 10. An increase in voltage Vout causes a switching of the output of comparator 14 to turn on transistor M2 which then absorbs the excess current.

Figure 3:
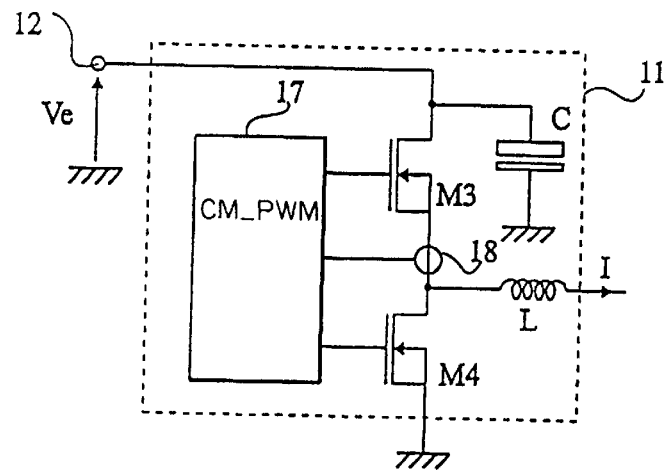
FIG. 3 shows an embodiment of a constant current source of the device shown in FIG. 2.

FIG. 3 shows an embodiment of a source 11 of constant current I according to the present invention. Source 11 here is formed of a converter of current-controlled switched-mode power supply type. This converter includes two MOS transistors (here, with N channels) M3, M4, connected in series between terminal 12 of application of supply voltage Ve and the ground. The midpoint of the series connection of transistors M3 and M4 is connected to a first terminal of an inductance L, a second terminal of which provides current I. Transistors M3 and M4 are controlled by a current-controlled pulsewidth modulation circuit 17 (CM_PWM). A current detector 18 is interposed between the source of transistor M3 and the midpoint of the series association of transistors M3 and M4, and controls circuit 17. A chemical filtering capacitor C is placed between terminal 16 and the ground.

A feature of this embodiment is that transistor M3 is, like previously-described transistor M2, controlled to operate in the linear portion of its current-voltage characteristic, to minimize the power dissipation, while circuit 11 generates, permanently, a current I corresponding to the maximum current (for example, on the order of 10 A) that load 2 is likely to surge. Current I in inductance L is controlled by circuit 17 by means of current detector 18, for example, a current transformer, a detection transistor, or any other adapted device. Inductance L is sized so that the minimum value of the current flowing therethrough is higher than or equal to the minimum value of the current surged by the load. Thus, the current ripple in inductance L does not influence the output voltage. The maximum current likely to be surged by load 2 is increased by on the order of 10%.

As long as voltage Vout across capacitor C' (FIG. 2) has not reached a minimum value, inductance L and transistor M2 and M4 are used to circulate current I freely. When the desired voltage Vout is reached, transistor M2 is blocked and transistor M1 is turned on after a slight idle time during which current I of inductance L flows through intrinsic diode D of transistor M1. Then, current I flows through turned-on transistor M1, and recharges capacitor C' to a maximum value. The minimum and maximum values correspond to the variation range of the hysteresis of comparator 14. Current I remains practically constant during the charge of capacitor C' and is equal to the chosen maximum current. The current ripple in inductance L increases during the recharge of capacitor C' since inductance L demagnetizes under the output voltage during a time which can reach the entire period of the cut-off frequency of circuit 17.

It should be noted that transistor M4 may possibly be replaced with a Schottky diode. However, using a MOS transistor has the advantage of leading to a better efficiency.

The value of capacitor C' is chosen according to the desired charge/discharge frequency and to the desired output current. At low charge, the capacitor is practically recharged by the entirety of the current available in inductance L. Thus, capacitor C' charges very fast while its discharge is very low. The constraints of voltage stability and rapidity of response to the variations of the current surged by the load are thus respected.

According to the present invention, a ceramic capacitor C' is chosen to exhibit a very low equivalent series resistance (ESR) (in practice lower than approximately 5 mΩ). Indeed, at low charge, capacitor C' charges with the maximum current at the switching of transistors M1 and M2, and the recharge time would considerably decrease if the series resistance was too high.

Amplifiers of circuit 13 and capacitors 14 having fast response times will preferably be chosen to precisely control the output voltage. As a specific example, for a voltage Vout of 2.1 volts and an accuracy of ±5% (±1% for the accuracy of the reference voltage and 14% for the hysteresis), a 250 nanosecond delay in the response of comparator 14 and of circuit 13 increases voltage Vout by 68 mV with C'=40 μF and I=11 A (low charge). At high charge, voltage Vout decreases by 68 mV. It will thus be provided to reduce the hysteresis of comparator 14 by an equivalent value to keep a voltage Vout within imposed tolerance limits.

An advantage of the present invention is that output voltage Vout is practically independent from abrupt variations of the current due to microprocessor 2. Indeed, voltage Vout is comprised between two fixed hysteresis thresholds.

Another advantage of the present invention is that it is not necessary to have, within the converter, a fast response loop that would make the circuit more complex.

Another advantage of the present invention is that it decreases the size of output capacitor C' (as a specific example, a ceramic capacitor of 40 μF is sufficient), or even to use the decoupling capacitors generally implanted with the microprocessor (for example, 40 capacitors of 1 μF). Preferably, circuit 11 and device 10 are implemented in the form of separated units and device 10 is implanted as close as possible to microprocessor 2 to use these decoupling capacitors.

Another advantage of the present invention is that it increases the reliability of the microprocessor power supply by suppressing the use of chemical capacitors which have a low lifetime. Further, voltage Vout, which is not subjected to the drifts of chemical capacitors, is then determined precisely.

Still another advantage of the present invention is that it only places, in the vicinity of the microprocessor, regulation device 10 which is of limited size, and moves current source unit 11, which is more bulky, further away from microprocessor 2 on the implantation board.

It should be noted that, since circuits 10 and 11 are independent from each other and operate asynchronously, other adapted current sources may be used. In particular, source 11 may be formed of a linear current regulator.

Figure 4:
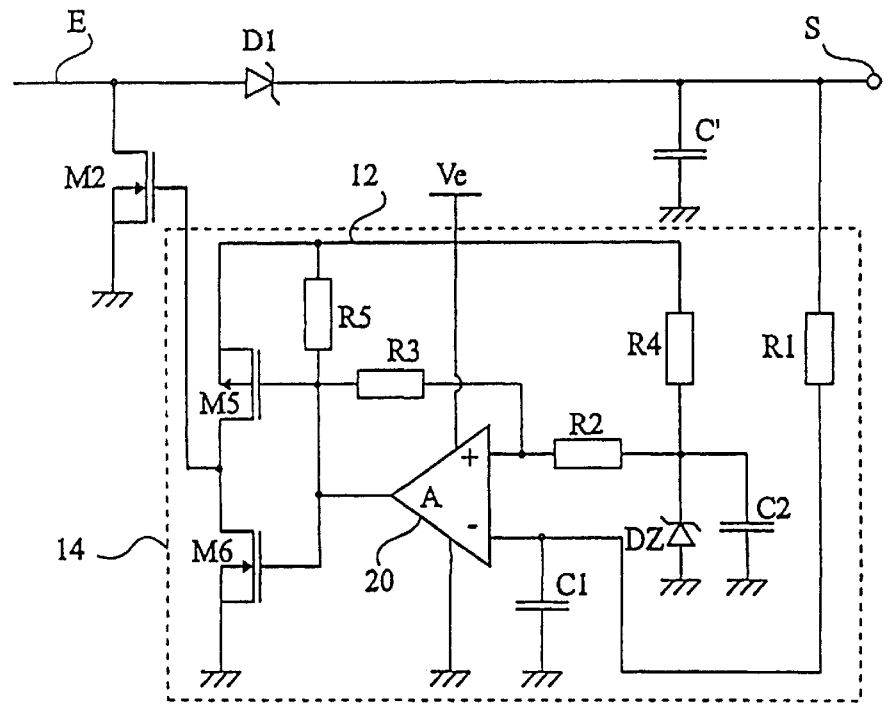
FIG. 4 shows a detail of a second embodiment of a device according to the present invention.

FIG. 4 illustrates an alternative implementation of the present invention in which transistor M1 and its intrinsic diode D are replaced with a Schottky diode D1. Such an alternative avoids using a level shifting and timing circuit 13. Indeed, since the direction of the current is imposed by diode D1, it is no longer required to delay the turning-on to set the current direction with intrinsic diode D of the MOS transistor. Further, diode D1 does not require any control signal. However, the use of a transistor rather than a Schottky diode has the advantage of providing a better efficiency.

In FIG. 4, an embodiment of hysteresis comparator 14, an output of which directly controls transistor M2 for which a level shifter is no longer necessary, has been shown. Circuit 14 is, for example, formed based on an operational amplifier 20, an inverting input terminal of which is connected, via a resistor R1, to terminal S. A low value capacitor C1 is placed between the inverting input of amplifier 20 and the ground. Cell R1C1 conditions the delay of the hysteresis of comparator 14 and is used for the filtering. The voltage reference is provided by a zener diode DZ, the anode of which is connected to the ground and the cathode of which is connected, via a resistor R2, to a non-inverting input terminal of amplifier 20. A decoupling capacitor C2 is mounted in parallel on diode DZ. The non-inverting input terminal of amplifier 20 is connected to its output via a resistor R3. The voltage amplitude of the hysteresis depends on the ratio between resistances R3 and R2. Amplifier 20 is supplied by voltage Ve. A resistor R4 is connected between the cathode of diode DZ and terminal 12, and a resistor R5 is placed between the output of the amplifier and terminal 12. The output of amplifier 20 is connected to the gates of two MOS transistors M5, M6, connected in series between terminal 12 and the ground. The midpoint of the series connection of transistors M5 (with a P channel) and M6 (with an N channel) is connected to the gate of transistor M2.

The function of resistor R5 is to enable the output of amplifier 20 to substantially reach potential Ve in the case where amplifier 20 is an open collector output stage amplifier.

Of course, the present invention is likely to have various alterations, modifications, and improvements which will readily occur to those skilled in the art. In particular, the practical implementation of circuit 13 (FIG. 2) with level shiftings and idle times for the control of transistor M1 is within the abilities of those skilled in the art based on the functional indications given hereabove. Further, the sizing of the different components of the device according to the present invention is also within the abilities of those skilled in the art.

Further, although, for clarity, no programming of the hysteresis and of the reference voltage from the load (terminal CTRL, FIG. 2) has been taken into account in the discussion of FIG. 4, a hysteresis comparator programmable in reference voltage and hysteresis amplitude, for example, based on 4 bits issued by the microprocessor, will preferably be used. The implementation of such a comparator is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system for providing a regulated voltage to supply a load, including:
    a source for providing a substantially constant current approximately corresponding to the maximum current likely to be drawn by the load; and
    a regulation device receiving, on an input terminal, the constant current and providing, on an output terminal, the regulated load supply voltage, at least one capacitor being connected between the output terminal and the ground;
    wherein the regulation device includes:
    a hysteresis comparator receiving the load supply voltage and a reference voltage; and
    at least one first MOS transistor, connected between the input terminal and the ground, the first transistor being controlled by the comparator by being biased in the linear portion of its current-voltage characteristic.

2. The system of claim 1, wherein the regulation device includes a Schottky diode connecting the input terminal to the output terminal.

3. The device of claim 1, wherein the regulation device includes a second MOS transistor, a source of which is connected to the input terminal and a drain of which is connected to the output terminal, the second transistor being controlled, from the hysteresis comparator, by a circuit introducing a delay at the turning-on of the second transistor.

4. The system of claim 1, wherein the constant current source is formed of a current-controlled switched-mode power supply, a third MOS transistor, connected between the ground and a first terminal of an inductance, a second terminal of which provides the constant current, wherein the third MOS transistor is controlled in the linear portion of its current-voltage characteristic.

5. The system of claim 1, wherein the constant current source is formed by a linear current regulator.

6. The system of claim 1, wherein the capacitor is a ceramic capacitor.

7. A device for limiting transient variations of a voltage provided by the system of claim 1 from a power converter forming the current source, including:
    a first MOS power transistor connected between the input terminal and the ground;
    a one-way conduction element connected between the input terminal and the output terminal; and
    means for detecting the regulated voltage and for controlling the first transistor in the linear portion of its current-voltage characteristic.

8. The device of claim 7, wherein the one-way conduction component is formed of a second MOS transistor, a source of which is connected to the input terminal and a drain of which is connected to the output terminal.

* * * * *